United States Patent [19]

King, Sr.

[11] 4,249,562
[45] Feb. 10, 1981

[54] INLINE DISPERSAL VALVE

[76] Inventor: Lloyd H. King, Sr., 311 Blake Rd., Hopkins, Minn. 55343

[21] Appl. No.: 958,167

[22] Filed: Nov. 6, 1978

[51] Int. Cl.³ .............................................. B01D 11/02
[52] U.S. Cl. ..................................... 137/268; 239/310;
422/263; 422/277; 422/282
[58] Field of Search ................. 137/268; 422/263, 264, 422/282, 277, 276; 239/310

[56] References Cited

U.S. PATENT DOCUMENTS

| | | | |
|---|---|---|---|
| 3,618,539 | 11/1971 | Daniels | 137/268 X |
| 3,846,078 | 11/1974 | Brett | 137/268 X |
| 3,901,262 | 8/1975 | Gutkowski | 137/268 X |

Primary Examiner—Alan Cohan
Attorney, Agent, or Firm—Jacobson and Johnson

[57] ABSTRACT

An apparatus for controllably dispersing material into a fluid stream with the apparatus having a housing with a bottom section that attaches to a pipe line and a top section having a recess for a porous container to support a solid fluid soluble material. The porous container can be controllably inserted into a fluid stream through coaction of a spring and cap to control the amount of soluble material entering the fluid stream. A lower seal on the porous container prevents fluid from escaping from the line when the porous container is in the up position and an uper seal prevents leakage past the cap when the valve is in operation.

7 Claims, 2 Drawing Figures

INLINE DISPERSAL VALVE

BACKGROUND OF THE INVENTION

1. Field of the Invention

This invention relates generally to attachments for fluid pipe lines and, more specifically, to attachments for controllably dispersing fluid soluble materials into a fluid stream.

2. Description of the Prior Art

The concept of dissolving solid material and controllably releasing the material into a fluid stream such as with the bromination of swimming pools is accomplished by suspending a fluid soluble solid in the fluid stream. The present invention provides an improvement to prior art systems to allow a user to control the amount of material dispersed into the fluid stream.

SUMMARY OF THE INVENTION

Briefly, the present invention comprises an inline dispersal valve having a porous container for holding a solid. The porous container can be controllably lowered into the fluid stream. The porous container has a sealing means on one end to seal the porous container from the fluid stream when the solid is inserted into the porous container. A second sealing means on the housing prevents leakage of fluid from the inline dispersal valve when the valve is in operation.

DESCRIPTION OF THE PREFERRED EMBODIMENT

Figure 1:
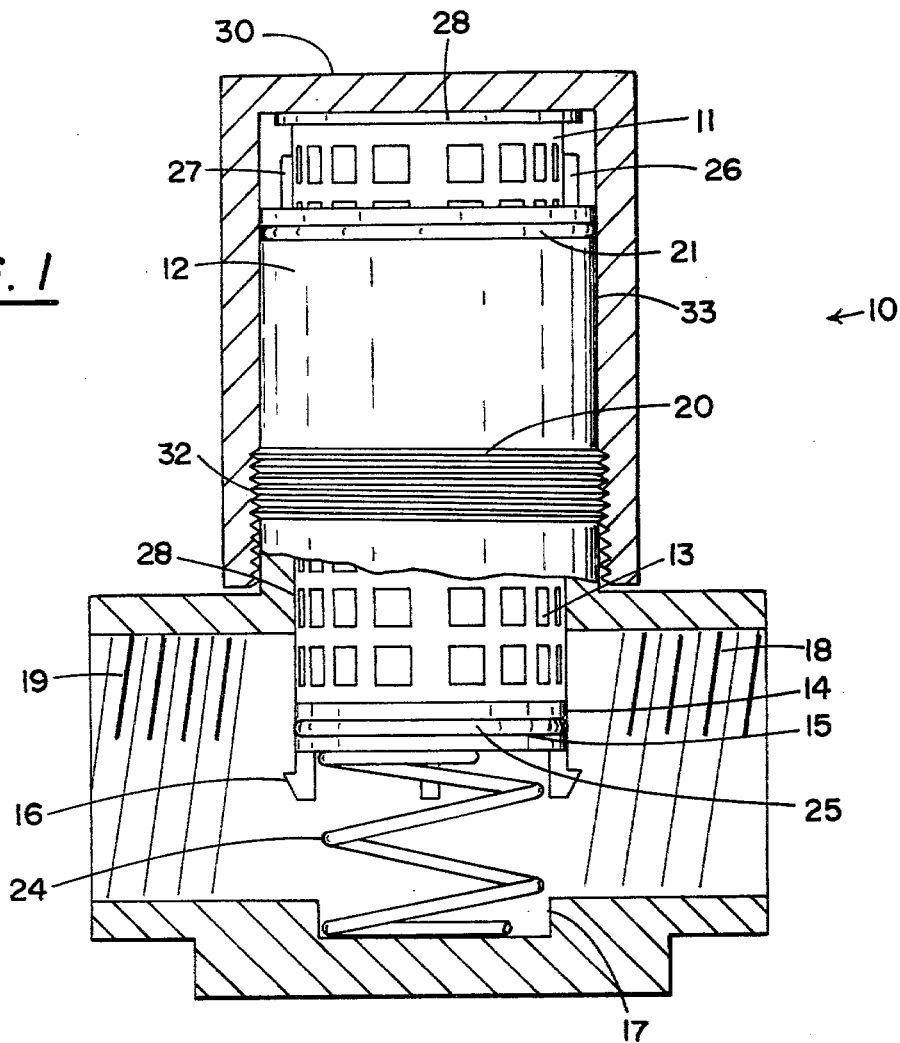
FIG. 1 is a partial sectional view of my inline dispersal valve.

Referring to FIG. 1, reference numeral 10 generally designates my inline solid dispersal valve comprising a T shaped housing 12, a porous container 11, and a cap 30. Housing 12 has a threaded insert 18 located on one end and a threaded insert 19 located on the other end for attachment of housing 12 to a fluid line. Slideably mounted within a cylindrical opening in housing 12 is a cylindrical porous container 11. Container 11 has a series of openings 13 therein which allow fluid to flow therethrough. The lower portion of container 11 contains a solid bottom 14 having a groove 15 with an 0 ring 25 therein.

Attached to the underside of container 12 are a set of one way catches 16 for retaining container 11 in housing 12 when cap 30 is removed. Located partially in recess 17 is a compression spring 24 that extends into pressure contact with the bottom of container 11. Spring 24 provides an upward force on container 11 causing the container top 28 to be held in pressure contact with the top inside surface of cap 30. Unscrewing cap 30 allows spring 24 to force container 11 upward. If cap 30 is unscrewed completely, container 11 rises until catches 16 engage the inside of housing 10 thereby preventing spring 24 or the fluid pressure from forcing container 11 out of housing 16. This position is defined as the up condition. Spring 24 insures that container 11 always returns to the up condition when cap 30 is removed thereby preventing injury to anyone removing cap 30 when the fluid line is under pressure. With container 11 in the up condition, 0 ring 25 seats against the interior cylindrical sealing surface 28 in housing 11 thereby preventing fluid from the line entering container 11 when the cap 30 is removed. Sealing the fluid line from container 11 eliminates the necessity of the user shutting off the pressure in the fluid line when cap 30 is removed. With cap 30 removed, the user can insert a new solid into container 11. Thus an advantage of the present invention is the ease in which a solid can be added to container as well as eliminating the need to shut off the fluid line when solids are added to container 11.

After insertion of the solid material in container 11, the user screws the threads 32 on cap 30 onto the threads 20 on housing 10. Besides thread section 20 the interior of cap 30 has a smooth cylindrical surface 33 located above the threaded section 20 which forms a sealing surface for engagement with 0 ring 21.

Screwing cap 30 onto housing 10 forces container 11 downward into the fluid stream. To prevent rotation of container 11 during rotation of cap 30, a pair of guides 26 and 27 located on basket 11 slideably follow a vertical groove located in the interior of housing 10. As container 11 is lowered fluid enters the lower openings in container 11. To prevent fluid in container 13 from leaking past the cap, 0 ring seal 21 on housing 11 coacts with smooth cylindrical surface 33 to prevent leakage between cap 30 and housing 10.

Figure 2:
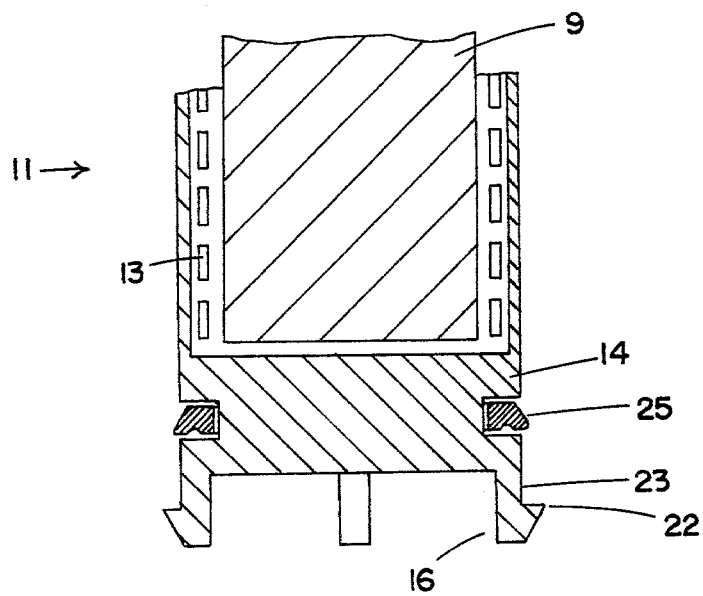
FIG. 2 is an enlarged view of the sealing means on the bottom of the porous container of my inline dispersal valve.

Referring to FIG. 2, there is shown an enlarged sectioned view of container 11 with the bottom container 11 having a solid material 9 located therein. In operation fluid flows through openings 13 and around the solid thereby slowly dissolving and dispersing the solid material into the fluid stream.

One can control the amount of fluid flowing through container 11 by lowering or raising container 11. Lowering or raising container 11 controls the concentration of solid material dissolved and dispersed in the fluid stream, i.e. the more fluid flowing through container 11, the greater concentration of dissolved solid in the stream.

Instead of an 0 ring seal, container 11 has a one way seal 25 which has an outward projecting lip to thereby prevent fluid from seaping past the basket when the basket is in the up condition. Tabs or catches 16 are shown in more detail to comprise a lip 22 attached to a semiflexible neck 23. The lip 22 has a slanted face for ease of insertion in housing 10. Flexible neck 23 allows the catches to bend inward during the assembly process. After assembly, lips 22 engage the inside of housing 10 to prevent container 11 from being forced out of container 11.

Another feature of the present invention is that spring 24 allows container 11 to slide downward into the fluid stream should the gas pressure in the cap 30 and container 11 exceed a certain value. For example, if one places chlorine in container 11 and places cap 30 on the housing without turning cap 30 down sufficiently far to lower container 11 into the fluid stream, the gas generated by the chlorine could increase causing rupture of the cap 30 if container 11 were locked in position. However, spring 24 allows container 11 to slide downward allowing gas to enter the fluid stream even though cap 30 is not down sufficiently far as to displace container 11 into the fluid stream.

In operation, thread 32 and thread 20 engage before top 28 of container 11 engages the inside of cap 30. Thus insuring that no fluid will escape through container 11 during installation of cap 30.

Preferably, valve 10 is made from a polymer plastic; however, metals are also suitable for use in manufacture of my valve.

I claim:

1. An inline dispersal valve for controllably releasing material into a fluid line comprising:
   a housing having a means for attachment to a pressurized fluid line, said housing having an opening therein operable for fluid coupling with fluid in a fluid line;
   a porous container slideably mounted in opening in said housing;
   means for controllably raising or lowering said container into the pressurized fluid line to allow fluid to flow through said container to thereby dissolve soluble solid in said container and transport said dissolved material into the fluid stream; and
   resilient means for maintaining said container in contact with said means for controllably raising or lowering said container.

2. The invention of claim 1 including coacting sealing surfaces located in said housing and the bottom of said container to thereby prevent fluid from flowing into said container when said container is in the up position.

3. The invention of claim 2 wherein said means for controllably raising or lowering said container includes a threaded cap for controllably raising and lowering the container in said housing.

4. The invention of claim 3 wherein said cap and said housing including a second set of sealing surfaces to prevent leakage of fluid past said cap and said housing.

5. The invention of claim 4 wherein said container includes means to retain said container in said housing when said cap is removed from said housing.

6. The invention of claim 5 wherein said container includes means to prevent rotation of said container during rotation of said cap.

7. The invention of claim 6 wherein said container has a recess therein for placing a solid material therein.

* * * * *